United States Patent
Autry et al.

(10) Patent No.: US 9,919,791 B2
(45) Date of Patent: Mar. 20, 2018

(54) STIFFENING STRUCTURES, WING STRUCTURES, AND METHODS FOR MANUFACTURING STIFFENING STRUCTURES

(71) Applicant: Gulfstream Aerospace Corporation, Savannah, GA (US)

(72) Inventors: Brenden Autry, Savannah, GA (US); Bryan Williams, Savannah, GA (US); Travis Cope, Savannah, GA (US); Susan Daggett, Savannah, GA (US); John McGuire, Savannah, GA (US); Michael McKee, Savannah, GA (US); Charles Aitken, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 198 days.

(21) Appl. No.: 14/687,022

(22) Filed: Apr. 15, 2015

(65) Prior Publication Data

US 2016/0304187 A1 Oct. 20, 2016

(51) Int. Cl.
*B64C 1/00* (2006.01)
*B64C 3/18* (2006.01)
(Continued)

(52) U.S. Cl.
CPC .............. *B64C 3/187* (2013.01); *B29C 70/00* (2013.01); *B29C 70/342* (2013.01);
(Continued)

(58) Field of Classification Search
CPC ........... B64C 1/12; B64C 3/187; B32B 37/14; B32B 37/1018; B29D 99/0014; B29C 70/00; B29C 70/342
See application file for complete search history.

(56) References Cited

U.S. PATENT DOCUMENTS

| 3,587,914 | A  | * | 6/1971 | Jennings et al. | ....... B64D 37/06 220/560.02 |
| 6,190,484 | B1 | * | 2/2001 | Appa | ..................... B29C 70/32 156/169 |

(Continued)

FOREIGN PATENT DOCUMENTS

| DE | 60200504 T2 | 6/2005 |
| DE | 102008057247 B3 | 1/2010 |
| DE | 102009060706 B4 | 12/2014 |

OTHER PUBLICATIONS

Bowman et al. "Mechanical Properties of Triaxial Braided Carbonepdxy Composites" (see attached wayback machine document for date).*

(Continued)

*Primary Examiner* — Assres H Woldemaryam
(74) *Attorney, Agent, or Firm* — LKGlobal | Lorenz & Kopf, LLP

(57) ABSTRACT

Stiffening structures, wing structures and methods for manufacturing stiffening structures are provided. In accordance with an exemplary embodiment, a stiffening structure includes a first longitudinal member, a second longitudinal member, and a first rib that extends from the first longitudinal member to the second longitudinal member and is integral with the first longitudinal member and the second longitudinal member. The first longitudinal member has a first wall, a second wall and a joining wall that joins the first wall and second wall. The first wall, the second wall and the joining wall form a space having a trapezoidal shape.

20 Claims, 4 Drawing Sheets

(51) Int. Cl.
  *B32B 37/10* (2006.01)
  *B29C 70/00* (2006.01)
  *B29C 70/34* (2006.01)
  *B29D 99/00* (2010.01)

(52) U.S. Cl.
  CPC ...... *B29D 99/0014* (2013.01); *B32B 37/1018* (2013.01); *Y02T 50/433* (2013.01)

(56) References Cited

U.S. PATENT DOCUMENTS

| | | | | | |
|---|---|---|---|---|---|
| 7,159,822 | B2* | 1/2007 | Grantham | ................ | B64C 1/12 244/119 |
| 7,325,771 | B2* | 2/2008 | Stulc | ................ | B64C 1/069 244/119 |
| 7,475,850 | B2* | 1/2009 | Vetillard | ................ | B64C 1/18 244/117 R |
| 8,042,315 | B2* | 10/2011 | Ashton | ................ | E04C 2/20 244/119 |
| 8,540,921 | B2* | 9/2013 | Senibi | ................ | B32B 5/18 264/257 |
| 8,720,824 | B2* | 5/2014 | Martinez Fernandez | . | B64C 1/26 244/123.1 |
| 8,906,179 | B2* | 12/2014 | Coxon | ................ | B29C 70/32 156/189 |
| 2003/0042364 | A1* | 3/2003 | Tanaka | ................ | B64C 3/20 244/123.2 |
| 2004/0035979 | A1* | 2/2004 | McCoskey, Jr. | ................ | B64C 3/26 244/117 R |
| 2005/0247818 | A1* | 11/2005 | Prichard | ................ | B64C 1/12 244/1 R |
| 2008/0290214 | A1* | 11/2008 | Guzman | ................ | B29C 43/10 244/119 |
| 2010/0133380 | A1* | 6/2010 | Roebroeks | ................ | B32B 15/08 244/119 |
| 2011/0139932 | A1* | 6/2011 | Matheson | ................ | B64C 3/182 244/132 |
| 2014/0186586 | A1* | 7/2014 | Victorazzo | ................ | B64C 1/064 428/167 |
| 2014/0372086 | A1* | 12/2014 | Kamenomostskiy | ................ | G06F 17/5004 703/2 |
| 2015/0086745 | A1* | 3/2015 | Griess | ................ | B29C 73/10 428/63 |
| 2016/0355273 | A1* | 12/2016 | Perez Diaz | ................ | B64D 37/08 |

OTHER PUBLICATIONS

German Patent and Trademark Office, Search Report in Application No. 10 2016 106 692.3, dated Oct. 14, 2016.

* cited by examiner

STIFFENING STRUCTURES, WING STRUCTURES, AND METHODS FOR MANUFACTURING STIFFENING STRUCTURES

TECHNICAL FIELD

The technical field generally relates to stiffening structures, wing structures, and methods for manufacturing stiffening structures and more particularly relates to integrated stiffening structures and wing structures made of composite materials and methods of manufacturing such stiffening structures.

BACKGROUND

Stiffening structures for stiffening long flat panels often use a ladder-type configuration secured to the panels to provide rigidity and support to the panels. Applications of such stiffening structures include fuselage, winglets, and other wing-like parts used in the commercial and military aircraft industries. FIG. 1 illustrates a typical ladder-type structure 10 secured to a wing skin panel 16. A first spar 12 and a second spar 14 extend along a length of the wing skin panel 16 from a base end 20 to a tip end 22. A third spar 18 lies between the first spar 12 and the second spar 14 and extends along a portion of the first spar 12 and the second spar 14 from the base end 20. A number of ribs 24 couple the first spar 12 to the third spar 18 and the third spar to the second spar 14. The spars and the ribs typically are of I-beam or C-beam configuration. Accordingly, to further stiffen the structure 10, a core 26 is embedded in the wing skin panel in the area of the ribs. The core is typically made of a honeycomb resin material.

While these ladder-type configurations stiffen and strengthen long structures such as fuselage- or wing-type structures, they display several drawbacks. The members of the ladder-type configuration, such as ribs and spars, are typically attached to each other using fixing devices, for example, screws, bolts, or nuts. Consequently, manufacturing the ladder-type configurations using such fixing mechanisms is quite time consuming and expensive. In addition, the members and the fixing devices usually are made of metal that adds weight to the stiffening structures. Further, the ladder-type configurations provide only limited stiffening support, thus requiring that the stiffening structures use additional stiffening mechanisms, such as core 26.

Accordingly, it is desirable to provide stiffening structures made of rigid but lightweight composite material. In addition, it is desirable to provide stiffening structures that are time- and cost-efficient to manufacture. It also is desirable to provide methods for manufacturing such stiffening structures. Furthermore, other desirable features and characteristics of the present invention will become apparent from the subsequent detailed description of the invention and the appended claims, taken in conjunction with the accompanying drawings and this background of the invention.

BRIEF SUMMARY

Stiffening structures, wing structures and methods for manufacturing stiffening structures are provided. In accordance with an exemplary embodiment, a stiffening structure includes a first longitudinal member, a second longitudinal member, and a first rib that extends from the first longitudinal member to the second longitudinal member and is integral with the first longitudinal member and the second longitudinal member. The first longitudinal member has a first wall, a second wall and a joining wall that joins the first wall and second wall. The first wall, the second wall and the joining wall form a space having a trapezoidal shape.

In accordance with another embodiment, a wing structure includes a first wing panel having a first end and a longitudinal axis and a stiffening structure fixedly attached to the first wing panel. The stiffening structure includes a first spar and a second spar that each extends from the first end along the longitudinal axis of the first wing panel. The first spar and the second spar each have a length. A third spar lies between the first spar and the second spar and extends along at least a portion of the length of the first spar and/or the second spar. A first rib extends from the first spar to the third spar and is integral with the first spar and the third spar. A second rib extends from the third spar to the second spar and is integral with the third spar and the second spar.

In accordance with a further embodiment, a method for manufacturing a stiffening structure includes depositing a flexible and drapable composite material into a cavity of a mold, inserting the mold into a bag, effecting a vacuum in the bag, curing the flexible and drapable composite material to form the stiffening structure within the mold, and removing the stiffening structure from the mold. The stiffening structure includes a first longitudinal member and a second longitudinal member. A first rib extends from the first longitudinal member to the second longitudinal member and is integral with the first longitudinal member and the second longitudinal member. A second rib extends from the first longitudinal member to the second longitudinal member and is integral with the first longitudinal member and the second longitudinal member. The first longitudinal member and the second longitudinal member each have a first wall, a second wall and a joining wall that joins the first wall and second wall. The first wall, the second wall and the joining wall form a space having a trapezoidal shape.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various exemplary embodiments of stiffening structures, wing structures, and methods for manufacturing stiffening structures are provided herein. The stiffening structures include integrated longitudinal members and ribs and are made from a single mold. In this respect, manufacture of the structures is efficient with respect to both time and cost. The members and ribs of the structures are configured with two walls that provide significantly more load-bearing support than single-walled supports of conventional ladder-type configurations. In addition, the stiffening structures are fabricated from composite materials that cause the structures to be lighter than the conventional ladder-type configurations that contain metal.

Figure 2:
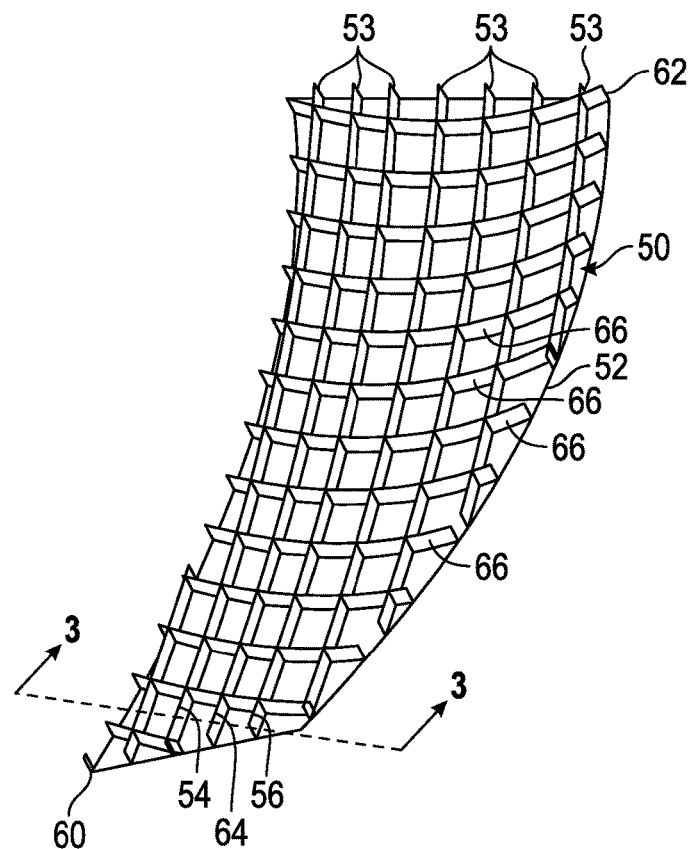
FIG. 2 is a stiffening structure attached to a skin panel in accordance with an exemplary embodiment.

Referring to FIG. 2, a stiffening structure 50 in accordance with an exemplary embodiment is secured to a panel 52. The panel 52 can be any panel requiring stiffening or additional support for bearing load. For example, panel 52 can be that used in the aerospace or aeronautical industries for an aircraft fuselage, an aircraft horizontal tail, and the like. The stiffening structure 50 is secured to the panel 52 using any suitable fastening mechanism, such as, for example, an adhesive, screws, nails, clips, and the like.

The stiffening structure 50 includes a plurality of longitudinal members 53 including a longitudinal member 54 and a longitudinal member 56 that both extend from a first end 60 to a second end 62 of the panel 52. In an exemplary embodiment, the longitudinal members 53 are substantially parallel to each other, although in other embodiments the longitudinal members may intersect each other. In an embodiment, a longitudinal member 64 is positioned between longitudinal member 54 and longitudinal member 56. The lengths of longitudinal member 54, longitudinal member 56, and longitudinal member 64 may be independent of each other. Their lengths and their positions relative to each other are dependent on the application and configuration of the overall structure, such as, for example, a fuselage of an aircraft. In one embodiment, the longitudinal members 53 are curvilinear, as shown in FIG. 2. In another embodiment, not shown, the longitudinal members 53 are linear. While FIG. 2 illustrates longitudinal members 54, 64, and 56 specifically, it will be appreciated that the stiffening structure 50 may include two or more longitudinal members with the number of longitudinal members dependent on the overall application for which the stiffening structure will be used.

The stiffening structure 50 also contains a plurality of ribs 66. In an exemplary embodiment, the ribs 66 are substantially perpendicular to the longitudinal members 53, although the ribs may be at an angle to the longitudinal members in an alternative embodiment. Each rib 66 extends from one longitudinal member 53 to an adjacent longitudinal member, for example, from longitudinal member 54 to longitudinal member 64 or from longitudinal member 64 to longitudinal member 56. The ribs 66 are integral with the longitudinal members 53 at the intersection of the ribs and the longitudinal members. In this regard, the stiffening structure lacks seams between the ribs and the longitudinal members that would provide areas of weakness for the overall structure. The number of ribs and the spacing of the ribs from each other depend on the application and configuration of the overall structure. In one embodiment, the ribs are curvilinear, as shown in FIG. 2. In another embodiment, not shown, the ribs are linear.

Figure 1:
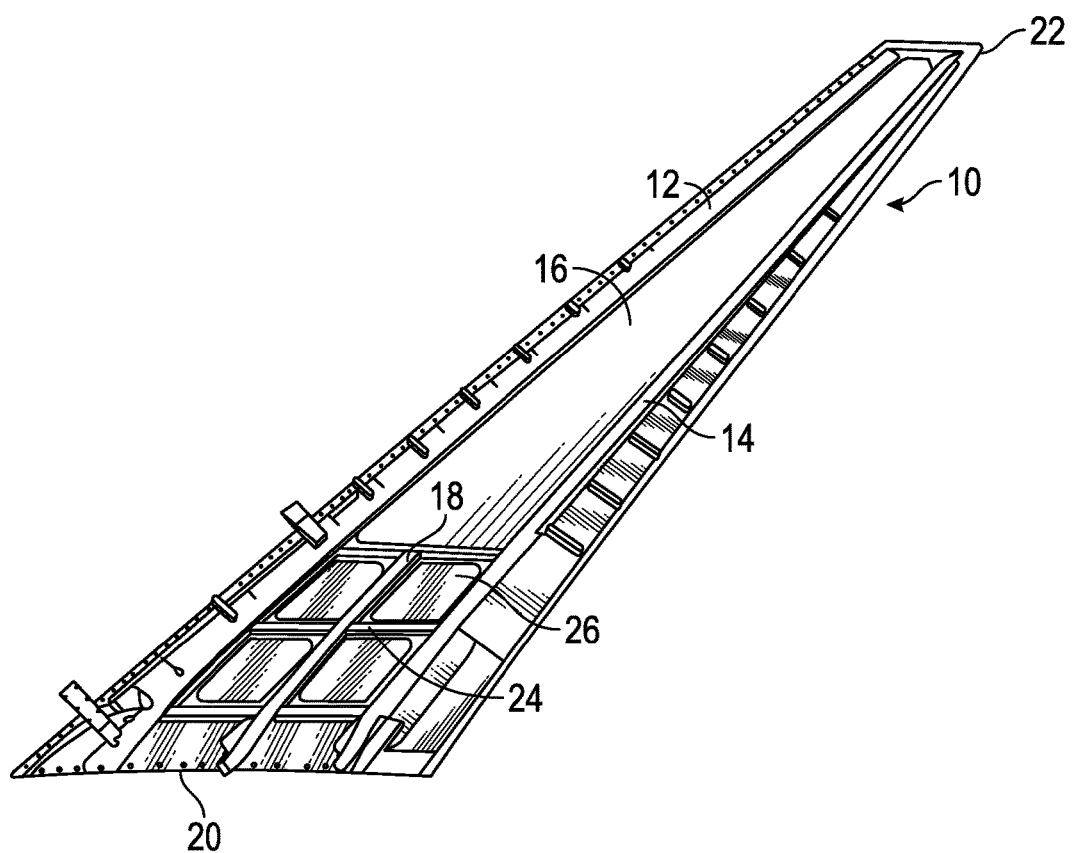
FIG. 1 is a perspective view of a conventional ladder-type configuration typically used for wing-type structures.
Figure 3:
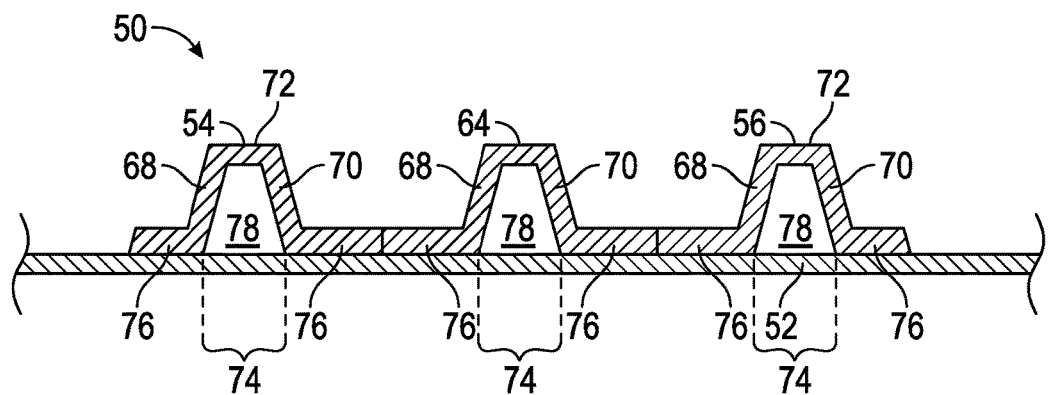
FIG. 3 is a cross-sectional view of the longitudinal members of the stiffening structure of FIG. 2 taken along axis 3-3.

FIG. 3 is a cross-sectional view of the stiffening structure 50 taken along axis 3-3 of FIG. 2. As illustrated in FIG. 3, longitudinal member 54, longitudinal member 56, and longitudinal member 64 are double-walled, that is, the longitudinal members have a first wall 68 and a second wall 70 coupled by a joining wall 72 that is relatively parallel to the panel 52. In this regard, the walls 68, 70 and 72 form a space 78 that has a trapezoidal shape. Footings 76 integral with the first wall 68 and the second wall 70 are attached to the panel 52. As noted above, the footings 76 are secured to the panel 52 using any suitable fastening mechanism, such as, for example, an adhesive, screws, nails, clips, and the like. While not shown, the ribs 66 contemplated herein also have walls 68, 70 and 72 that form a space that has a trapezoidal shape. With a trapezoidal cross-sectional shape, the ribs 66 and longitudinal members 53 are double-walled with walls 68 and 70 and, consequently, provide significantly more strength to the stiffening structure 50 than the single-walled ribs and longitudinal members of the conventional ladder-type configuration as illustrated in FIG. 1. In this regard, additional strengthening mechanisms, such as the embedded core 26 of FIG. 1, typically used in conventional ladder-type configurations are not necessary in the stiffening structure 50 contemplated herein. The dimensions of the trapezoidal shape, that is the height, length, top width and bottom width of the space 78 of the ribs 66 and longitudinal members 53 are dependent on the application and configuration of the overall structure. In one embodiment, the "bay area" 74, defined as the bottom width of the space 78 or the distance between the walls 68 and 70 as measured at the panel 52 is sufficiently wide so that the stiffening structure 50 is easily removable from a mold during manufacture, as discussed in more detail below. The number of longitudinal members 53 and ribs 66, the bay areas 74, and the spacing of the longitudinal members and ribs depend on the application of the overall application for which the stiffening structure will be used.

Figure 4:
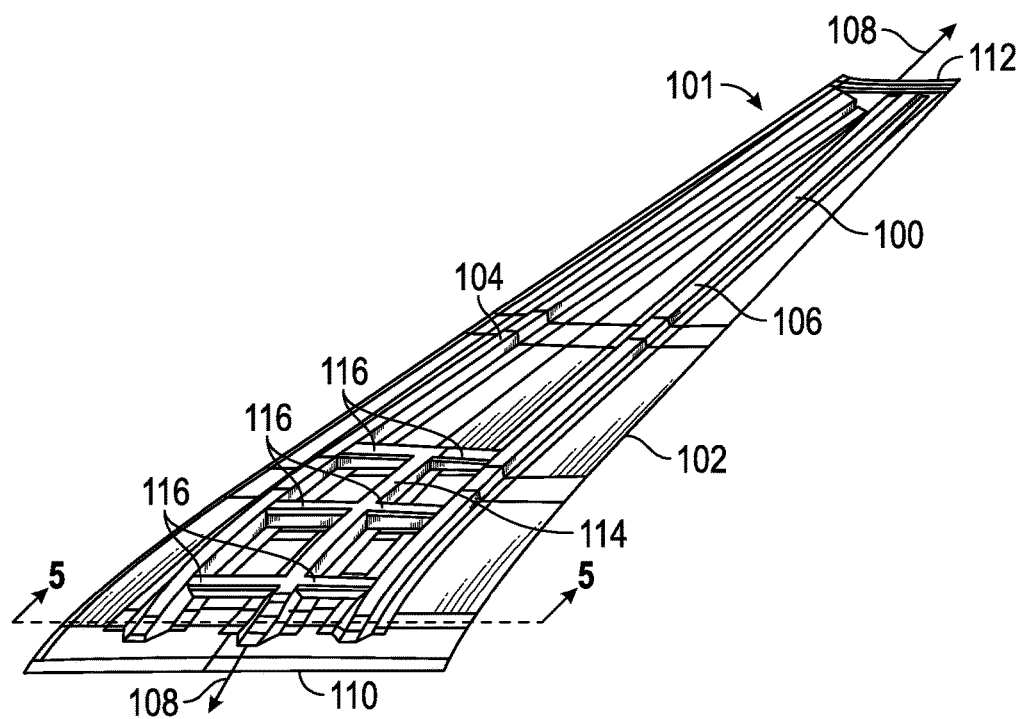
FIG. 4 is a wing structure in accordance with an exemplary embodiment.

FIG. 4 illustrates a stiffening structure 100 in accordance with another exemplary embodiment. In this embodiment, stiffening structure 100 is secured to a skin panel 102 that can be a skin panel used in the aerospace or aeronautical industries to form a wing structure 101, such as wing, a winglet, an aileron, or the like. The stiffening structure 100 includes a spar 104 and a spar 106 that lie generally along a longitudinal axis 108 of the skin panel 102 from a first end 110 to a second end 112 of the skin panel 102. A spar 114 is positioned between spar 104 and spar 106. Spar 114 lies from the first end 110 of the skin panel along the longitudinal axis 108 and terminates at a point between the first end 110 and the second end 112 of the skin panel along at least a portion of a length of spar 104 and/or spar 106. While two spars 104 and 106 that extend the length of the skin panel 102 are illustrated in FIG. 4, it will be appreciated that the stiffening structure 100 is not so limited and can have more than two such spars extending from the first end 110 to the second end 112 of the skin panel. Similarly, while only one spar 114 is illustrated in FIG. 4 positioned between spar 104 and spar 106, the stiffening structure 100 is not so limited and more than one spar 114 can be positioned therebetween. The length of spar 104, spar 106 and spar 114 and their positions relative to each other are dependent on the application and configuration of the overall structure, such as, for example, as a main wing or as a winglet.

The stiffening structure 100 also contains a rib 116 that extends from spar 104 to spar 114. In an exemplary embodiment, a rib 116 also extends from spar 114 to spar 106. The rib 116 is integral with the spars. In this regard, the stiffening structure 100 lacks seams between the ribs and the spars that would provide areas of weakness for the overall structure. In an exemplary embodiment, the stiffening structure 100 has three ribs 116 spaced from each other and that extend between spar 104 and spar 114 and between spar 114 and spar 106. The spacing of the ribs from each other depends on the application and the configuration of the overall stiffening structure. While three ribs are illustrated in FIG. 4 positioned between spar 104 and spar 114 and between spar 114 and spar 106, it will be appreciated that the stiffening structure is not so limited and may have one, two or more than three ribs between spar 104 and spar 114. Similarly, the stiffening structure may have one, two or more than three ribs between spar 114 and spar 106.

Figure 5:
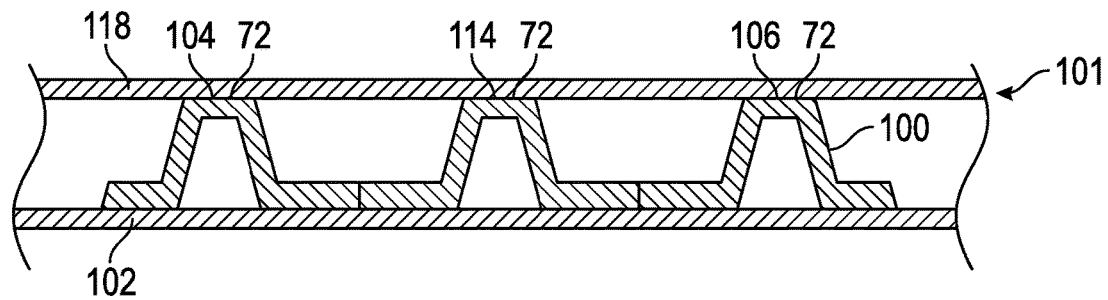
FIG. 5 is a cross-sectional view of the spars of the stiffening structure of FIG. 4 in accordance with an exemplary embodiment.

In an exemplary embodiment, the stiffening structure 100 of the wing structure 101 is coupled to skin panel 102 and a skin panel 118, as illustrated in FIG. 5. More specifically, joining walls 72 of the stiffening structure 100 are attached to the skin panel 118 and the footings 76 are attached to the skin panel 102. The stiffening structure 100 is secured to the skin panels using any suitable fastening mechanism, such as, for example, an adhesive, screws, nails, clips, and the like, or a mixture thereof. In this regard, the stiffening structure 100 provides stiffening and load-bearing support directly to both the skin panel 102 and the skin panel 118.

As discussed in more detail below, the stiffening structure is formed from a flexible and drapable composite material that can be draped within crevices and over edges of a tooling mold but that, upon curing, provides strength and stiffness properties suitable for a desired application. In an exemplary embodiment, the stiffening structure is formed of carbon fiber reinforced plastic (CFRP). Such CFRP materials can be in the form of braided fabric, woven fabric, unidirectional tape, sheet molding compound, or bulk molding compound. In one embodiment, the material is a CFRP triaxial braid. For example, the material is QISO™ triaxial braided fabric available from A&P Technology of Cincinnati, Ohio.

Figure 6:
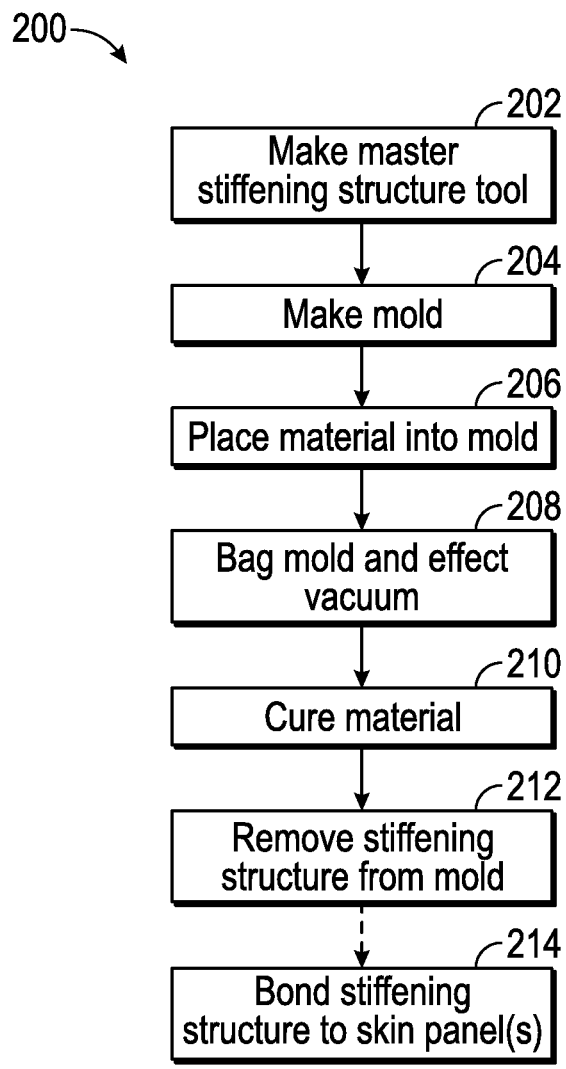
FIG. 6 is a flowchart of a method of forming a stiffening structure in accordance with an exemplary embodiment.

A method 200 of manufacturing a stiffening structure in accordance with an exemplary embodiment is illustrated in FIG. 6. A master stiffening structure tool is made with dimensions identical to the stiffening structure to be manufactured for the ultimate end product, such as the winglet, the main wing, or any other structure requiring stiffening and/or load-bearing support (step 202). As a mold for the stiffening structure will be made from the master stiffening structure tool, the master stiffening structure tool is made of any suitable material that can tolerate curing of the material from which the mold will be made. In one embodiment, the master stiffening structure tool is formed from stiff foam.

After the master stiffening structure tool is formed, a female mold of the stiffening structure is made from the master stiffening structure tool (step 204). In an exemplary embodiment, the mold is made of the same material from which the desired stiffening structure will be formed. In another exemplary embodiment, the mold is made of a material having a coefficient of thermal expansion that is similar to the coefficient of thermal expansion of the material from which the desired stiffening structure will be made. In this regard, the dimensional changes between the mold and the desired stiffening structure upon curing of the stiffening structure will be minimal or non-existent such that the stiffening structure can be removed from the mold with relative ease and with no damage to the stiffening structure. In another embodiment, the mold is made of any suitable material that can withstand curing of the material of the desired stiffening structure. For example, the mold can be formed of a metal or a stiff foam.

Next, the material from which the desired stiffening structure is to be formed is placed into the mold cavity (step 206). As noted above, the stiffening structure can be made from a flexible and drapable composite material that can be laid within crevices and over edges of the mold. In an exemplary embodiment, the stiffening structure is formed of CFRP. In another embodiment, the stiffening structure is formed of CFRP triaxial braid. Plies of the material are laid and draped into the mold to completely cover the walls of the mold and conform to the mold features. The plies are laid across intersections of ribs and spars such that the resulting stiffening structure is formed with integral spars and ribs. Splicing of the material can be used to accomplish even coverage of the mold.

In an exemplary embodiment, the mold is placed inside an air-tight bag in which a vacuum is effected (step 208) and the material then is cured (step 210). The curing process depends on the type of material selected for the stiffening structure. In an exemplary embodiment, the material is cured by autoclave at temperatures dependent upon the material. For example, for stiffening structures made from QISO™ MIM-A-16.25/E752 triaxial braided fabric, the mold and material is subjected to a curing temperature of about 350° F. In another embodiment, the material is cured by a room temperature cure with a post cure. Other cure processes are also available. Once cured, the stiffening structure is removed from the mold (step 212). The stiffening structure then can be inspected, trimmed and, optionally, bonded or otherwise affixed to one or more skin panels (step 214).

Accordingly, various exemplary embodiments of stiffening structures, wing structures, and methods for manufacturing stiffening structures are provided herein. The stiffening structures include integrated ribs and spars made from a single mold. In this respect, manufacture of the structures is efficient with respect to both time and cost. The members and ribs of the structures are configured with two walls that provide significantly more load-bearing support than single-walled supports of conventional ladder-type configurations. In addition, the stiffening structures are fabricated from composite materials that cause the structures to be lighter than the conventional ladder-type configurations that contain metal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft stiffening structure of composite material comprising: a first longitudinal member and a second longitudinal member; a first rib that extends from the first longitudinal member to the second longitudinal member and is directly integral with the first longitudinal member and the second longitudinal member; wherein the first longitudinal member has a first wall, a second wall and a joining wall that joins the first wall and the second wall, and wherein the first wall, the second wall and the joining wall form a space having a trapezoidal shapes wherein the first rib has a first wall, a second wall and a joining wall that joins the first wall and the second wall of the first rib, and wherein the first wall, the second wall and the joining wall of the first rib form a space having a trapezoidal shape; wherein the joining wall of the first rib shares a first plie of the composite material with the joining wall of the first longitudinal member.

2. The aircraft stiffening structure of claim 1, wherein the second longitudinal member has a first wall, a second wall and a joining wall that joins the first wall and the second wall, and wherein the first wall, the second wall and the joining wall forming a space having a trapezoidal shape.

3. The aircraft stiffening structure of claim 2, wherein the joining wall of the first rib shares a second plie of the composite material with the joining wall of the second longitudinal member.

4. The aircraft stiffening structure of claim 1, wherein the stiffening structure comprises carbon fiber reinforced plastic.

5. The aircraft stiffening structure of claim 1, wherein the first longitudinal member and the second longitudinal member are curvilinear.

6. The aircraft stiffening structure of claim 1, further comprising a panel attached to the first longitudinal member and the second longitudinal member.

7. An aircraft wing structure comprising: a first wing panel having a first end and a longitudinal axis; and a stiffening structure of composite material fixedly attached to the first wing panel and comprising: a first spar and a second spar that each extends from the first end along the longitudinal axis of the first wing panel, the first spar and the second spar each having a length; a third spar that lies between the first spar and the second spar and that extends along at least a portion of the length of the first spar and/or the second spar; a first rib that extends from the first spar to the third spar and is directly integral with the first spar and the third spar, and a second rib that extends from the third spar to the second spar and is directly integral with the third spar and the second spars wherein the first spar and the first rib each has a first wall, a second wall and a joining wall that joins the first wall and the second wall, and wherein the first wall, the second wall and the joining wall form a space having a trapezoidal shape, and wherein the joining wall of the first spar shares a plie of the composite material with the joining wall of the first rib.

8. The aircraft wing structure of claim 7, wherein the third spar has a first wall, a second wall and a joining wall that joins the first wall and the second wall, and wherein the first wall, the second wall and the joining wall of the third spar form a space having a trapezoidal shape, and wherein the joining wall of the third spar shares a plie of the composite material with the joining wall of the first rib.

9. The aircraft wing structure of claim 7, wherein the second spar has a first wall, a second wall and a joining wall that joins the first wall and the second wall, and wherein the first wall, the second wall and the joining wall form a space having a trapezoidal shape; and wherein the joining wall of the second spar shares a plie of the composite material with the joining wall of the second rib.

10. The aircraft wing structure of claim 7, wherein the joining wall of the third spar shares a plie of the composite material with the joining wall of the second rib.

11. The aircraft wing structure of claim 7, wherein the stiffening structure comprises carbon fiber reinforced plastic.

12. The aircraft wing structure of claim 7, wherein the wing structure is a main wing, a winglet, or a horizontal tail.

13. A method for manufacturing an aircraft stiffening structure, the method comprising the steps of: depositing a plurality of plies of a flexible and drapable composite material into a cavity of a mold; inserting the mold into a bag; effecting a vacuum in the bag; curing the flexible and drapable composite material to form the stiffening structure within the mold; and removing the stiffening structure from the mold, the stiffening structure comprising: a first longitudinal member and a second longitudinal member; a first rib that extends from the first longitudinal member to the second longitudinal member and is directly integral with the first longitudinal member and the second longitudinal member; and a second rib that extends from the first longitudinal member to the second longitudinal member and is directly integral with the first longitudinal member and the second longitudinal member, wherein the first longitudinal member and the first rib each has a first wall, a second wall and a joining wall that joins the first wall and second wall, and wherein the first wall, the second wall and the joining wall form a space having a trapezoidal shape, wherein the joining wall of the first rib shares a first plie of the plurality of plies of the flexible and drapable composite material with the first longitudinal member.

14. The method of claim 13, wherein the second longitudinal member has a first wall, a second wall and a joining wall that joins the first wall and the second wall, wherein the first wall, the second wall and the joining wall form a space having a trapezoidal shape, and wherein the joining wall of the first rib shares a second plie of the plurality of plies of the flexible and drapable composite material with the second longitudinal member.

15. The method of claim 13, wherein depositing comprises depositing a carbon fiber reinforced plastic (CFRP).

16. The method of claim 15, wherein depositing comprises depositing a CFRP triaxial braid.

17. The method of claim 13, further comprising, prior to depositing, fabricating the mold such that the first longitudinal member and the second longitudinal member are formed curvilinear.

18. The method of claim 13, wherein depositing comprises depositing into the mold fabricated from the flexible and drapable composite material.

19. The method of claim 13, further comprising attaching the stiffening structure to a skin panel.

20. The aircraft stiffening structure of claim 1, wherein the first plie and the second plie are the same plie.

* * * * *